United States Patent [19]
Golden et al.

[11] Patent Number: 5,819,168
[45] Date of Patent: Oct. 6, 1998

[54] ADAPTIVE COMMUNICATION SYSTEM AND METHOD USING UNEQUAL WEIGHTING OF INTERFACE AND NOISE

[75] Inventors: Glenn David Golden, Boulder, Colo.; Carol Catalano Martin, Fair Haven, N.J.; Nelson Ray Sollenberger, Tinton Falls, N.J.; Jack Harriman Winters, Middletown, N.J.

[73] Assignee: AT&T Corp, Middletown, N.J.

[21] Appl. No.: 850,027

[22] Filed: May 1, 1997

[51] Int. Cl.⁶ ........................................................ I04B 1/10
[52] U.S. Cl. ............................................. 455/303; 455/301
[58] Field of Search .............................. 455/63, 132, 139, 455/272, 273, 276.1, 278.1, 296, 307, 506, 561, 562; 375/346, 347, 350, 267, 207, 201, 349

[56] References Cited

U.S. PATENT DOCUMENTS 4,639,914  1/1987  Winters .
5,481,570  1/1996  Winters .

OTHER PUBLICATIONS

Jack H. Winters, "Signal Acquisition and Tracking with Adaptive Arrays in the Digital Mobile Radio System IS–54 with Flat Fading", IEEE Transactions on Vehicular Technology, vol. 42, No. 4 (Nov. 1993).

Jack H. Winters, "The impact of Antenna Diversity on the Capacity of Wireless Communication Systems", IEEE Transactions on Communications, vol. 42, No. 2/3/4 (Feb./Mar./Apr. 1994).

*Primary Examiner*—Reinhard J. Eisenzopf
*Assistant Examiner*—Makoto Aoki

[57] ABSTRACT

A communication system and method, particularly adapted for use in adaptive antenna arrays, are presented. A plurality of signals containing a desired signal, interference, and noise are received through an array of antennas connected to a base receiving station. The signal arriving at each antenna is weighted according to computations which adjust those weights as a function of received interference and noise power in an unequal manner, based on the estimation accuracy of the interference and noise, which in turn depends on factors such as interference to noise power ratios and fading rate.

39 Claims, 2 Drawing Sheets

ADAPTIVE COMMUNICATION SYSTEM AND METHOD USING UNEQUAL WEIGHTING OF INTERFACE AND NOISE

FIELD OF THE INVENTION

The invention relates to the field of communication technology, and particularly to receiving stations having multiple-antenna arrays, the signals received through which are selectively combined to produce an output signal.

BACKGROUND OF THE INVENTION

It is known in the communication art that receiving stations equipped with antenna arrays, rather than single antennas, can improve receiver performance. Antenna arrays can both reduce multipath fading of the desired signal and suppress interfering signals. Such arrays can consequently increase both the range and capacity of wireless systems. This is true for instance of wireless cellular telephone and other mobile systems.

In mobile systems, a variety of factors cause signal corruption. These include interference from other mobile users within or near a given cell. Another source of signal degradation is multipath fading, in which the received amplitude and phase of a source varies over time. The fading rate can reach as much as 200 Hz for a mobile user traveling at 60 mph at PCS frequencies of about 1.9 GHz. In such environments, the problem is to cleanly extract the signal of the user being tracked from the collection of received noise, interference, and desired signal portions summed at the antennas of the array.

It is furthermore known in the art that upon receiving that collection of signals, one manner of extracting the desired signal is to take the signal arriving at each antenna of the array, multiply it by a weighting factor, then sum the weighted or adjusted signals from each of the antennas to produce the output signal. The desired signal-to-interference-plus-noise ratio (SINR) is increased as much as possible in the summed output. This helps achieve accurate reception and, in digital signals, reduces the bit error rate (BER).

Given that antenna arrays offer recognized advantages including greater total received signal power, a key issue is the optimal calculation of the weights used in the array. Different approaches to weight generation have been presented in the art.

If the channels of the desired and interfering signals are known, the weight generation technique that maximizes the SINR, as well as minimizes the mean squared error (MMSE) between the output signal and the desired output signal, is the well-known Weiner-Hopf equation, $$w = [R_{xx}]^{-1} r_{xd}, \quad (1)$$

where $r_{xd}$ denotes the crosscorrelation of the received signal vector x with the desired signal, given by $$r_{xd} = E[x^* d] \quad (2)$$

where d is the desired signal, and $R_{xx}$ is the received signal correlation matrix, which in turn is defined as $$R_{xx} = E[x^* x^T], \quad (3)$$

where the superscript * denotes complex conjugate and T denotes transpose. It is important to note that the received signal consists of desired signal, noise, and interference, and thus (3) can also be expressed as $$R_{xx} = E[x^* x^T] = P_d u_d u_d^T + \sigma^2 I + \sum_{j=1}^{L} P_j u^*_j u_j^T, \quad (4)$$

where $P_d$ is the power of the desired signal, $u_d$ is the channel vector for the desired signal, $\sigma^2$ is the noise power, $P_j$ and $u_j$ are the power and channel vector of the jth interferer, and L is number of interferers. A variation of this weight equation is given by $$w = [R_{i+n}]^{-1} r_{xd}, \quad (5)$$

where $$R_{i+n} = E[(x - r^*_{xd} d)^* (x - r^*_{xd} d)^T] \quad (6)$$

These weights differ only by a scalar factor from (1), and therefore the output SINR is the same.

However, these prior techniques represent only an idealized case, in that the channel is assumed to be stationary and perfect knowledge of the channel characteristics ($R_{xx}$ and $r_{xd}$) is assumed to arrive at the calculation of the weights. When the channel characteristics are non-stationary and unknown, the standard technique in the prior art is to estimate $R_{i+n}$ and $r_{xd}$ from the received signals, e.g., using a rectangular window of K samples, the weights at time k are given by, $$w(k) = \hat{R}_{i+n}^{-1}(k) \hat{r}_{xd}(k), \quad (7)$$

where $$\hat{R}_{i+n}(k) = \frac{1}{K} \sum_{j=k-K+1}^{k} (x(j) - \hat{r}^*_{xd} d)^* (x(j) - \hat{r}^*_{xd} d)^T, \quad (8)$$

and $$\hat{r}_{xd}(k) = \frac{1}{K} \sum_{j=k-K+1}^{k} x^*(j) \hat{d}(j). \quad (9)$$

where the hat symbol denotes estimates of $R_{i+n}$, $r_{xd}$, and d. This method uses estimated values (these are the maximum likelihood estimates with K samples in a stationary environment) for $R_{i+n}$, $r_{xd}$, and d in the Weiner-Hopf equation, as if the channels were indeed stationary and these values were exactly known.

This technique is referred to in the literature as Direct Matrix Inversion (DMI) or sampled matrix inversion. This DMI technique however produces weights which deviate from the ideal (MMSE) for at least two reasons. The first source of degradation is error propagation. For the desired signal estimate in (9), the DMI algorithm can use a known training sequence, but if the channel varies between training sequences, then it must also use estimates of the desired signal data. The standard known method is to use the data detected from the output signal. However, errors in detection cause errors in the weights, increasing the BER, and possibly giving rise to error propagation through the receiving system which can last until the next training sequence.

The second cause of degradation is that the channel characteristics can vary over the duration of the K-symbol window. Thus, the window size must be kept as small as possible to keep the estimates accurate. However, in DMI it is computationally the case that the estimates are noisy because of the finite length of the window. In DMI, the SINR degradation due to noise depends on the ratio of K to the number of weights (M), which is also the number of antennas. For example, when K/M=2, that loss is approximately 3 dB and the loss increases with M. Because of this loss, increasing the number of antennas (with a fixed K) can lead to a decrease in performance when the weights are estimated using DMI, which is contrary to the effect with the ideal weights where the performance always increases with M.

Since this weight estimation error can cause a large degradation in output SINR as compared to the ideal weight case, prior art methods to reduce this degradation have been proposed for specific interference situations. If it is assumed that there is noise only, and no interference, then (5) reduces to the maximal ratio combining (MRC) weights given by $$w = r_{xd}, \quad (10)$$

and the weights can be calculated by $$w(k) = \hat{r}_{xd}(k), \quad (11)$$

which ignores any interference. If it is assumed that there is a very strong interferer which dominates the effect of the noise, then eigenanalysis can be effectively used, with the weights given by $$w(k) = (I - \hat{u}_1^*(k)\hat{u}_1^T(k))\hat{r}_{xd}(k), \quad (12)$$

which completely cancels the interference without regard to the noise level. Note that this algorithm operates with weights that are orthogonal to the subspace of the interference. Although (11) and (12) give much better performance than DMI when there is no interference and when there is a dominant interferer, respectively, they can do much worse than DMI when the assumed conditions are not true. That is, (11) degrades the performance more as the interference level increases, and (12) degrades the performance more as the single interferer level decreases relative to the noise and other interference. In general, both techniques do much worse than DMI when the noise and interference have similar powers, which is often the case in wireless communication systems.

All of the foregoing (DMI, MRC, and eigenanalysis) weight generation techniques for antenna arrays are known in the art, and each achieves extraction of the desired signal to a greater or lesser extent, depending on conditions. Further discussion of them may be found in the literature, including in the papers: J. H. Winters, "Signal Acquisition and Tracking with Adaptive Arrays in the Digital Mobile Radio System IS54 with Flat Fading", IEEE Transactions on Vehicular Technology, Vol. 42, No. 4 (November 1993); J. H. Winters et. al, "The Impact of Antenna Diversity on the Capacity of Wireless Communication Systems", IEEE Transactions on Communications, April 1994; and U.S. Pat. No. 4,639,914 entitled "Wireless PBX/LAN System With Optimum Combining", and U.S. Pat. No. 5,481,570 entitled "Block Radio and Adaptive Arrays for Wireless Systems", both to J. H. Winters, each paper or patent including one of the inventors of the present application, and being incorporated by reference herein.

None of the foregoing approaches, however, has achieved what could be considered adequate results under a wide range of communication conditions. The known systems suffer from disadvantages, including adequate performance only under specific known conditions, with poor performance when those conditions do not hold, and poor performance in the most common condition of a mixture of interference and noise. Therefore, there is a strong need for a system that works well under all interference and noise conditions, even without any prior knowledge of the environment, i.e., a weight calculation technique that itself adapts to the interference environment.

SUMMARY OF THE INVENTION

The invention overcoming these and other problems in the art is in one aspect an adaptive communication system and method for applying controllable weights to channels associated with multiple-antenna receiver arrays. The communication system and method of the invention employs a weighting scheme in which weights are generated using estimated values for the interference and/or noise, which are adjusted in unequal fashion, depending on their estimation accuracy. Greater performance, including but not limited to when interference and noise are nearly equal, results.

In another aspect the invention provides a communication system and method which varies the weights according to the noise and interference powers, i.e., the prevailing communication conditions.

In another aspect the invention provides a communication system and method which reduces dependence on estimated interference or noise, as errors in those estimates increase.

In another aspect the invention provides a communication system and method which may be adapted to improve upon DMI, eigenanalysis and other previously known array techniques.

In another aspect the invention provides a communication system and method which enhances the performance of wireless cellular telephone and other mobile communication systems.

The invention more particularly relates to typically applying a weighting factor ($\beta_0$) to the noise component and different weighting factors ($\beta_1$ through $\beta_M$) to the interference components, although it will be appreciated by persons skilled in the art that mathematically different forms of unequal weighting could be used.

BRIEF DESCRIPTION OF THE DRAWINGS

The invention will be described with reference to the following drawings.

DETAILED DESCRIPTION OF PREFERRED EMBODIMENTS

Figure 1:
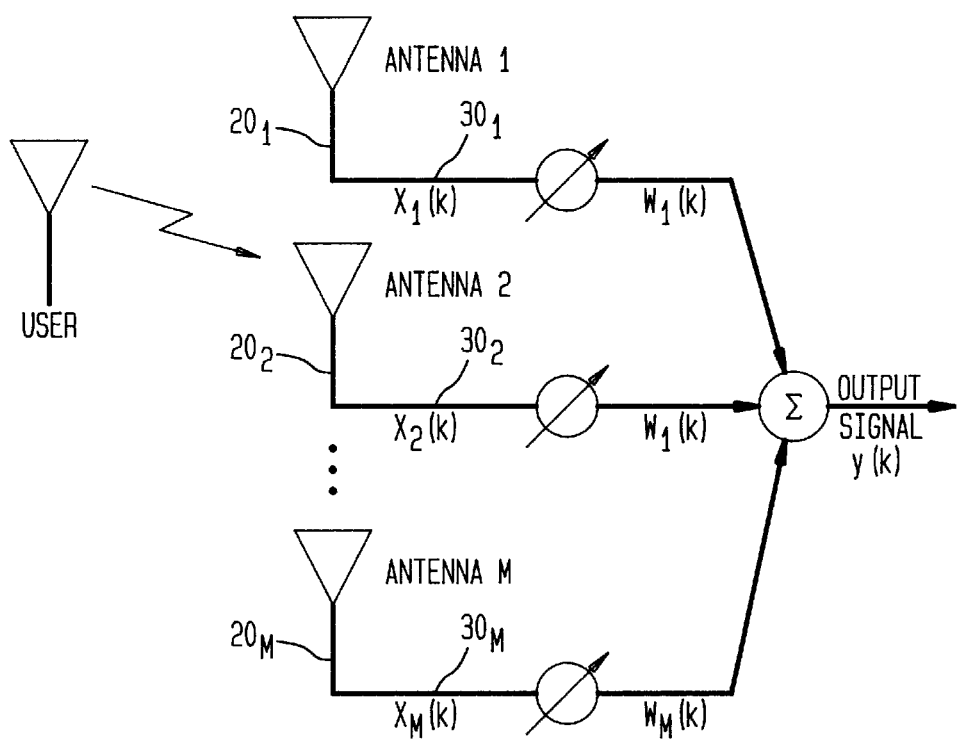
FIG. 1 illustrates an antenna array receiving system, in schematic form.
Figure 2:
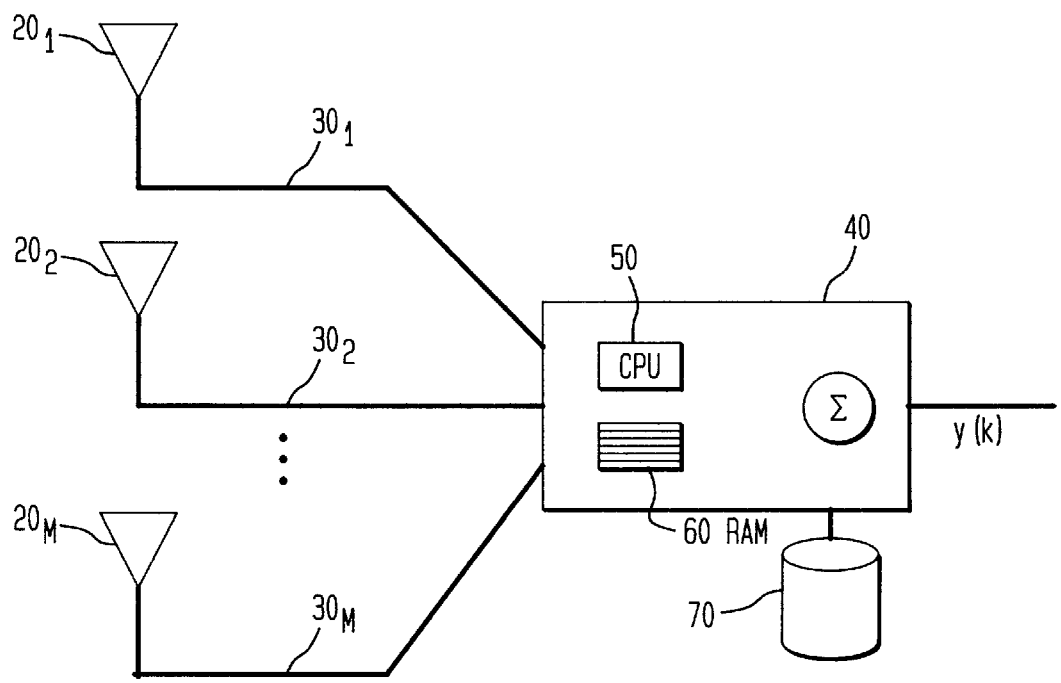
FIG. 2 illustrates receiver station components, in the invention.

As illustrated in FIG. 1, the communication system and method of the invention relates to an antenna array illustratively consisting of a plurality of generally matched antenna elements, $20_1$ through $20_M$. Each antenna element of the array receives RF signals and passes the received signals through a group of corresponding channels $30_1$ through $30_M$. As illustrated in FIG. 2, channels $30_1$ through $30_M$ in turn are connected to processing unit 40, which typically contains a CPU 50, electronic memory 60, fixed storage 70, signal processing and related circuitry and software, connected with appropriate bus and other circuitry, as will be appreciated by persons skilled in the art. Processing unit 40 is constructed to determine and apply the weights necessary to carry out the system and method of the invention, as described herein.

As noted above, in DMI and other prior art receiver systems, errors can intrude into the generated weights because these methods use estimates, rather than the ideal values (which are generally not known at the receiver), for the crosscorrelation matrix $R_{xx}$ or $R_{i+n}$ and desired signal correlation vector $r_{xd}$, in weight equations that assume ideal values.

The inventors have made the following observations, which have helped motivate their inventive communication approach. First, if the BER is low enough, as is typically the case in a properly operating wireless communication system, the primary cause of SINR degradation is the estimation error of $R_{xx}$ or $R_{i+n}$, rather than $r_{xd}$. Furthermore and as can be shown, the estimation error of $R_{xx}$ grows with M, while the estimation error of $r_{xd}$ is independent of M. Third, $R_{xx}$ is composed of desired signal, noise, and interference, as shown in (4), while $R_{i+n}$ is composed of noise and interference. Specifically, $R_{i+n}$ can be expressed in terms of its eigenvectors, $$R_{i+n} = \sum_{i=1}^{M} \lambda_i e_i^* e_i^T, \tag{13}$$

where $\lambda_i$ and $e_i$ are the ith eigenvalue and eigenvector of $R_{i+n}$ respectively, where the $e_i$ result from orthogonalizing the interferer vectors $u_j$. Furthermore, (13) can be expressed in terms of noise and interference as $$R_{i+n} = \sigma^2 I + \sum_{i=1}^{M} (\lambda_i - \sigma^2) e_i^* e_i^T. \tag{14}$$

Fourth, the ideal weight equation (5) is based on an equal effect of the noise and interference on the SINR.

However, the estimation error of the interference eigenvectors can be different from that of the noise. For example, the noise level may be known very accurately (as is the thermal noise of the receiver which typically does not vary), while the interferer eigenvalues and eigenvectors can have substantial estimation error. Also, errors in the weights due to the estimated interference can have a greater effect on the SINR degradation than errors due to noise, and interference, being a signal which is not so much random as an analog of the desired signal, can affect the BER differently than ordinary noise.

Furthermore, the estimation error of the interferer eigenvectors ($\hat{e}_i$) generally depends on the strength of the interferer, with strong interferers estimated with greater accuracy than weaker interferers. Thus, equal weighting of the noise and interference (as in (7)) with weight estimation may not give the weights achieving lowest BER, even though unequal weighting would increase the BER in the absence of weight estimation error.

Therefore, the inventors in their communication system and method propose a weight generation approach that uses an unequal weighting of the noise and interference. The best unequal weighting will depend on the estimation error of the noise and interference, which in turn depends on the strength of the interferers relative to the noise, as well as other parameters such as fading rate, K, and M. This estimation error does not depend on desired signal strength, though, as seen in (14). Using unequal weighting, in the communication system and method of the invention 10 weight generation is given by $$w(k) = \left( \beta_0 \sigma^2 I + \sum_{i=1}^{M} \beta_i (\hat{\lambda}_i - \sigma^2) \hat{e}_i^* \hat{e}_i^T \right)^{-1} r_{xd}(k), \tag{15}$$

where $\hat{e}_i$ and $\hat{\lambda}_i$ are the ith eigenvector and eigenvalue of $\hat{R}_{i+n}(k)$.

It is advantageous for the $\beta_i$'s (i>0) to be a function of the $\hat{\lambda}_i$'s, i.e., the interference level, for example, $\beta_i = c(\hat{\lambda}_i - \sigma^2)^a$, where c is a constant and a increases with estimation error, i.e., increases with fading rate and M/K.

Several embodiments of the communication system and method of the invention are of interest. Note that (15) requires calculation of all the eigenvectors and eigenvalues of $\hat{R}_{i+n}(k)$, which can be computationally intensive. Therefore, the inventors propose reduced-complexity versions of (15) that require calculation of fewer (or no) eigenvectors and eigenvalues. The simplest implementation is to just weight the noise unequally with the total interference. In this case, (15) can be expressed as $$w(k) = ((1-\beta)\hat{R}_{i+n}(k) + \beta\sigma^2 I)^{-1} \hat{r}_{xd}(k), \tag{16}$$

which does not require calculation of eigenvectors or eigenvalues of $\hat{R}_{i+n}$. From before, extending (16) to the MMSE weight algorithm, $$w(k) = ((1-\beta)\hat{R}_{xx}(k) + \beta\sigma^2 I)^{-1} \hat{r}_{xd}(k), \tag{17}$$

As verified by results obtained by the inventors, when the interference-to-noise ratio (INR) is very large, $\beta=0$ gives the lowest BER. Conversely, when INR is very small, $\beta=1$ gives the lowest BER.

Figure 3:
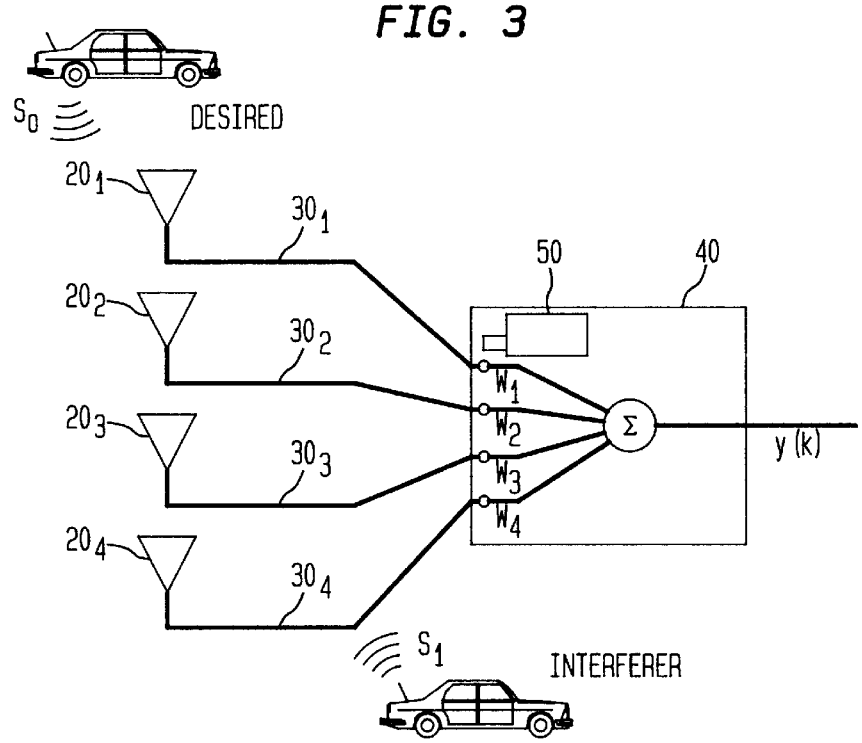
FIG. 3 illustrates a schematic example of the invention with a four-antenna arrangement in operation.

As schematically illustrated in FIG. 3, the communication system and method of the invention can be applied to a receiver station having 4 antennas (M=4), in which there is 1 interfering signal source $S_1$, along with the desired signal source $S_0$. If the INR is known in such a communication setting to be small, then $\beta$ might be set to 0.75, so that the noise is weighted three times as heavily as the interference.

The inventors have also determined that in the intermediate case, with INRs between the polar ends, there exists a range of $\beta$s, $0<\beta<1$, that give lower BER than the DMI or MRC approaches, with the largest improvement over those known techniques when the interference and noise powers are comparable. The inventors have verified that the optimum $\beta$ (for lowest BER) is independent of desired signal-to-noise ratio (SNR), and does depend on INR and fading rate (e.g., vehicle speed).

Therefore, in one illustrative set of conditions, consider the optimum $\beta$ for the worst case fading rate of 184 Hz. Thus, the optimum $\beta$ depends primarily on INR, decreasing with increasing INR. This is because the INR determines the estimation error in the weights for suppressing the interference. The inventors have determined that the BER is relatively insensitive to small variations about the optimum $\beta$. Given this insensitivity, an accurate estimation for the optimum $\beta$ as a function of INR (or I/N, in dB) under these conditions is $$\beta_{opt} = \begin{cases} 1 & I/N \leq -10 \\ \frac{20 - I/N}{30} & -10 < I/N \leq 5 \\ .5 & 5 < I/N \leq 8 \\ \frac{23 - I/N}{30} & 8 < I/N \leq 23 \\ 0 & 23 < I/N \end{cases} \tag{18}$$

$$\frac{tr[\hat{R}_{i+n}] - M\sigma^2}{M\sigma^2}$$

$$tr[\hat{R}_{i+n}(k)] = \frac{1}{K} \sum_{j=k-K+1}^{k} \sum_{i=1}^{M} |x_i(j) - \hat{r}^*_{xd_i}(j)d(j)|^2, \tag{19}$$

where $x_i$ and $\hat{r}_{xdi}$ are the ith elements of x and $\hat{r}_{xd}$, respectively. Thus, in the system and method of the invention one algorithm (with no parameters to be set in the field) can be used to estimate INR, for all environments. Alternatively, if INR is known beforehand, for instance if INR is known to vary over a small range or if design for a worst case INR is desired, then a constant $\beta$ can be used, as determined by this INR.

Figure 4:
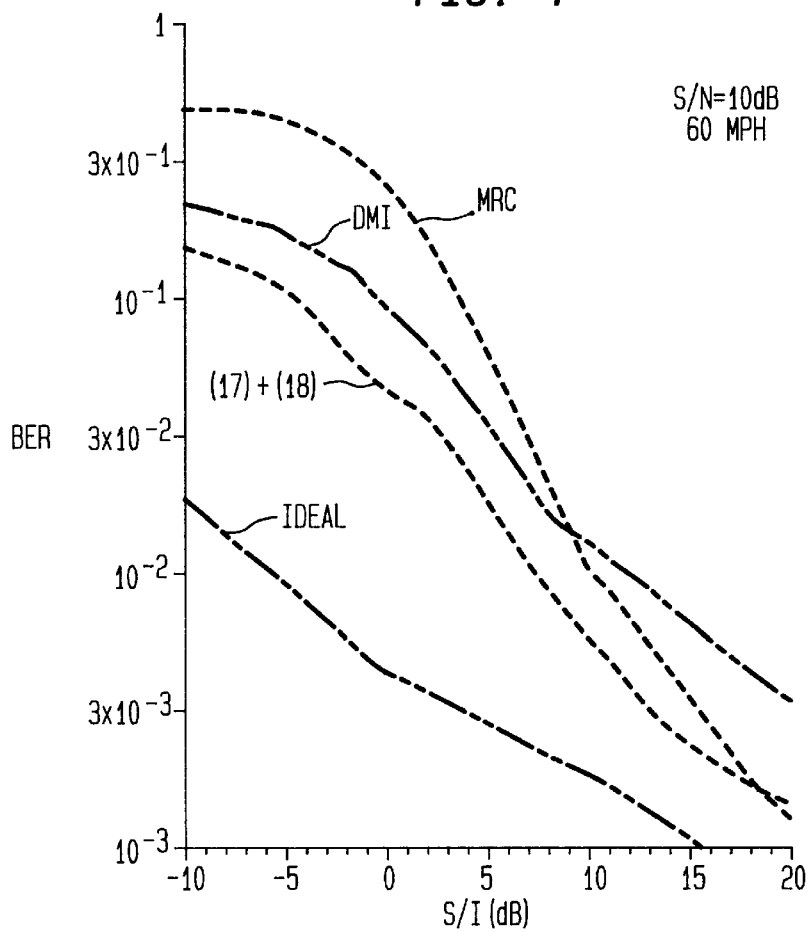
FIG. 4 illustrates graphs indicating the performance of a communication system according to the invention, and according to conventional systems.

FIG. 4 shows the BER versus SIR for the above method with SNR=10 dB with 184 Hz fading. Results for DMI, MRC, and ideal weights are also shown. The invention outperforms both DMI and MRC for all SIRs.

In another embodiment, consider only the largest eigenvalue $\lambda_1$ and the corresponding eigenvector $e_1$ of $\hat{R}_{i+n}$, which corresponds to the strongest interferer. This corresponds to a typical wireless system where there is one dominant interferer. Based on (15), the system of the invention in this case can be implemented by constructing weights as:

$$w(k)=((1-\beta_0-\beta_1)\hat{R}_{i+n}(k)+\beta_0\sigma^2 I+\beta_1(\hat{\lambda}_1-\sigma^2)\hat{e}_1{}^*\hat{e}_1{}^T)^{-1}\hat{r}_{xd}(k). \quad (20)$$

As before, the inventors have determined that their method provides substantial improvement over eigenanalysis (as well as DMI and MRC) with a single interferer, particularly when the interferer power is not dominant with respect to the noise. Also, as before, the $\beta_i$s can be obtained from tr[$\hat{R}_{i+n}$], but in this case $\beta_i$'s can also be obtained from the largest eigenvalue of $\hat{R}_{i+n}$, (corresponding to the eigenvector $\hat{e}_1$).

The foregoing description of the communication system and method of the invention is illustrative, and variations in construction and implementation will occur to persons skilled in the art. For instance, while illustrative embodiments are described in terms of an antenna array whose antenna elements are spatially diverse, the invention could be adapted to systems in which the received signal diversity is temporal in nature, that is, using a temporal equalizer rather than the spatial equalizer discussed above. Similarly, the technique can be used with joint spatial and temporal equalization. The invention is accordingly intended to be limited only by the following claims.

What is claimed:

1. A method for processing a plurality of received signals comprising the steps of:
   generating a plurality of weights based on a ratio of a desired signal power to an unequally weighted sum of noise power and interference power; and
   weighting and combining the plurality of received signals using the generated plurality of weights to enhance the desired signal and suppress interfering signals.

2. The method of claim 1 wherein the unequally weighted sum is based on an interference estimation accuracy.

3. The method of claim 1 wherein the unequally weighted sum is based on an interference to noise ratio.

4. The method of claim 3 wherein the interference to noise ratio is an estimate.

5. The method of claim 3 wherein the interference to noise ratio is a known value.

6. The method of claim 3 wherein the ratio of a desired signal power to an unequally weighted sum of noise power and interference power is an estimate.

7. The method of claim 1 wherein the interference power comprises a plurality of unequally weighted interference powers.

8. The method of claim 7 wherein the unequally weighted interference powers are estimates.

9. The method of claim 7 wherein the unequally weighted interference powers are based on individual interferer powers.

10. The method of claim 9 wherein the individual interferer powers are estimates.

11. The method of claim 2 wherein the unequally weighted sum is also based on a fading rate.

12. The method of claim 1 wherein the plurality of received signals are received from a plurality of spatially diverse receiving elements.

13. The method of claim 1 wherein the plurality of received signals are received from a plurality of temporally diverse receiving elements.

14. An apparatus processing a plurality of received signals, comprising:
   a weight generation unit, for generating a plurality of weights based on a ratio of a desired signal power to an unequally weighted sum of noise power and interference power; and
   a combining unit, for weighting and combining the plurality of received signals using the generated plurality of weights to enhance the desired signal and suppress interfering signals.

15. The apparatus of claim 14 wherein the unequally weighted sum is based on an interference estimation accuracy.

16. The apparatus of claim 14 wherein the unequally weighted sum of noise power and interference power is based on an interference to noise ratio.

17. The apparatus of claim 16 wherein the interference to noise ratio is an estimate.

18. The apparatus of claim 16 wherein the interference to noise ratio is a known value.

19. The apparatus of claim 16 wherein the ratio of a desired signal power to an unequally weighted sum of noise power and interference power is an estimate.

20. The apparatus of claim 14 wherein the interference power comprises a plurality of unequally weighted interference powers.

21. The apparatus of claim 20 wherein the unequally weighted interference powers are estimates.

22. The apparatus of claim 20 wherein the unequal weighting is based on individual interferer powers.

23. The apparatus of claim 22 wherein the individual interferer powers are estimates.

24. The apparatus of claim 15 wherein the unequally weighted sum is also based on a fading rate.

25. The apparatus of claim 14 wherein the plurality of received signals are received from a plurality of spatially diverse receiving elements.

26. The apparatus of claim 14 wherein the plurality of received signals are received from a plurality of temporally diverse receiving elements.

27. An apparatus processing a plurality of received signals received from mobile wireless sources, comprising:
   an antenna array comprising a plurality of antenna elements each operatively connected to antenna channels;
   a weight generation unit, operatively connected to the antenna array, for generating a plurality of weights for the antenna channels, based on a ratio of a desired signal power of a desired mobile user to an unequally weighted sum of noise power and interference power; and
   a combining unit, operatively connected to the weight generation unit, for weighting and combining the plurality of received signals using the generated plurality of weights to enhance the desired signal of the mobile user and suppress interfering signals.

28. The apparatus of claim 27 wherein the unequally weighted sum is based on an interference estimation accuracy.

29. The apparatus of claim 27 wherein the unequally weighted sum of noise power and interference power is based on an interference to noise ratio.

30. The apparatus of claim 29 wherein the interference to noise ratio is an estimate.

31. The apparatus of claim 29 wherein the interference to noise ratio is a known value.

32. The apparatus of claim 29 wherein the ratio of a desired signal power of a desired mobile user to an unequally weighted sum of noise power and interference power is an estimate.

33. The apparatus of claim 27 wherein the interference power comprises a plurality of unequally weighted interference powers.

34. The apparatus of claim 33 wherein the unequally weighted interference powers are estimates.

35. The apparatus of claim 33 wherein the unequal weighting is based on individual interference powers.

36. The apparatus of claim 35 wherein the individual interference powers are estimates.

37. The apparatus of claim 28 wherein the unequally weighted sum is also based on a fading rate.

38. The apparatus of claim 27 wherein the plurality of received signals are received from a plurality of spatially diverse receiving elements.

39. The apparatus of claim 27 wherein the plurality of received signals are received from a plurality of temporally diverse receiving elements.

* * * * *